United States Patent
Ryu et al.

(10) Patent No.: US 7,986,949 B2
(45) Date of Patent: Jul. 26, 2011

(54) METHOD FOR PERFORMING HANDOVER IN BROADBAND WIRELESS ACCESS SYSTEM

(75) Inventors: Ki Seon Ryu, Seoul (KR); Yong Won Kwak, Gyeonggi-do (KR); Beum Joon Kim, Seoul (KR); Yong Ho Kim, Gyeonggi-do (KR); Ki Hyoung Cho, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 42 days.

(21) Appl. No.: 11/123,403

(22) Filed: May 6, 2005

(65) Prior Publication Data

US 2005/0288022 A1    Dec. 29, 2005

Related U.S. Application Data (60) Provisional application No. 60/568,738, filed on May 7, 2004, provisional application No. 60/570,836, filed on May 14, 2004.

(30) Foreign Application Priority Data

| Sep. 22, 2004 | (KR) | 10-2004-0076085 |
| Nov. 11, 2004 | (KR) | 10-2004-0092156 |
| May 2, 2005 | (KR) | 10-2005-0036861 |

(51) Int. Cl.
*H04W 36/00* (2009.01)

(52) U.S. Cl. ........ 455/439; 455/436; 455/437; 455/438; 370/331

(58) Field of Classification Search .......... 455/436–444, 455/343.2, 574, 33.2, 418–420; 370/60, 370/331, 328, 429, 442
See application file for complete search history.

(56) References Cited

U.S. PATENT DOCUMENTS

| 5,499,387 | A | * | 3/1996 | Chambert ............ 455/436 |
| 5,530,693 | A | * | 6/1996 | Averbuch et al. .......... 370/331 |
| 6,144,653 | A | | 11/2000 | Persson et al. |
| 6,590,880 | B1 | | 7/2003 | Maenpaa et al. |
| 6,665,713 | B1 | | 12/2003 | Hada et al. |
| 6,704,789 | B1 | | 3/2004 | Ala-Laurila et al. |
| 6,735,202 | B1 | | 5/2004 | Ahmed et al. |

(Continued)

FOREIGN PATENT DOCUMENTS

CA    2397966    5/2002

(Continued)

OTHER PUBLICATIONS

IEEE 802.16e-03/07r5 TGe working document (Dec. 9, 2003) http://www.ieee802.org/16/tge/docs/80216e-03_07r5.zip.*

(Continued)

*Primary Examiner* — Wayne Cai (74) *Attorney, Agent, or Firm* — Lee, Hong, Degerman, Kang & Waimey (57) ABSTRACT

A method of entering sleep mode in a mobile subscriber station in performing handover from a first base station (BS) to a second BS is disclosed. More specifically, the method includes entering sleep mode in the first base station and transmitting from the first base station sleep mode information in the first base station during handover, while receiving from a second base station sleep mode entry information in the second base station. The method further includes entering sleep mode based on the information the sleep mode entry information received from the second base station.

16 Claims, 5 Drawing Sheets

U.S. PATENT DOCUMENTS

| | | | |
|---|---|---|---|
| 6,766,168 B1* | 7/2004 | Lim | 455/435.1 |
| 6,982,967 B1 | 1/2006 | Leung | |
| 7,006,472 B1 | 2/2006 | Immonen et al. | |
| 7,213,057 B2 | 5/2007 | Trethewey et al. | |
| 7,218,634 B1 | 5/2007 | Khalil et al. | |
| 7,675,938 B2* | 3/2010 | Kolze | 370/468 |
| 2001/0024443 A1 | 9/2001 | Alriksson et al. | |
| 2002/0035699 A1 | 3/2002 | Crosbie | |
| 2002/0057658 A1* | 5/2002 | Lim | 370/331 |
| 2002/0062388 A1 | 5/2002 | Ogier et al. | |
| 2002/0075823 A1* | 6/2002 | Lee et al. | 370/328 |
| 2002/0098840 A1 | 7/2002 | Hanson et al. | |
| 2002/0141361 A1 | 10/2002 | Madour et al. | |
| 2003/0053431 A1* | 3/2003 | Madour | 370/331 |
| 2003/0076808 A1 | 4/2003 | McNiff et al. | |
| 2003/0142642 A1 | 7/2003 | Agrawal et al. | |
| 2003/0185236 A1 | 10/2003 | Asano et al. | |
| 2004/0002333 A1* | 1/2004 | Neufeld | 455/436 |
| 2004/0013111 A1 | 1/2004 | Faccin | |
| 2004/0068571 A1 | 4/2004 | Ahmavaara | |
| 2004/0082312 A1 | 4/2004 | O'neill et al. | |
| 2004/0122976 A1 | 6/2004 | Dutta et al. | |
| 2004/0157607 A1 | 8/2004 | Kim et al. | |
| 2004/0179532 A1 | 9/2004 | Thubert et al. | |
| 2004/0203596 A1 | 10/2004 | Sreemanthula et al. | |
| 2004/0203765 A1 | 10/2004 | Das et al. | |
| 2004/0218556 A1* | 11/2004 | Son et al. | 370/311 |
| 2004/0235536 A1* | 11/2004 | Kim et al. | 455/574 |
| 2004/0266436 A1 | 12/2004 | Jaakkola et al. | |
| 2005/0025164 A1 | 2/2005 | Kavanagh et al. | |
| 2005/0027834 A1 | 2/2005 | Chen et al. | |
| 2005/0165953 A1 | 7/2005 | Obs et al. | |

FOREIGN PATENT DOCUMENTS

| | | |
|---|---|---|
| CN | 1413034 | 4/2003 |
| CN | 1424859 | 6/2003 |
| JP | 1995058771 | 3/1995 |
| JP | 1999103320 | 4/1999 |
| JP | 2002-186010 | 6/2002 |
| JP | 2004-112148 | 4/2004 |
| JP | 2004-120171 | 4/2004 |
| WO | 00/60811 | 10/2000 |
| WO | 2004/021728 | 3/2004 |

OTHER PUBLICATIONS

IEEE 802.16 TGe Working Document, IEEE 802.16e-03/07r5.*

IEE 802.16 Task Group e. "Part 16: Air Interface for Fixed and Mobile Broadband Wireless Access Systems—Amendment for Physical and Medium Access Control Layers for Combined Fixed and Mobile Operation in Licensed Bands", IEEE 802. 16e-03/07r5, IEEE 802.16 TGe working Document [online], Dec. 9, 2003 [retrieved on Oct. 13, 2006]. Retrieved from the Internet: < URL:http://www.ieee802.org/16/tge/docs/80216e-03_07r5.zip.. figure Og, figures D. 11-D.12, sub-sections 6.4.2.3.5, 6.4.2.3.6, 6.4.2.3.42, 6.4.2.3.43, section 6.4.17.

Kitroser, I. et al. "IEE802.16e Sleep Mode", IEEE C802.16e-03/15, IEEE 802.16 Broadband Wireless Access Working Group [online], Mar. 6, 2003 [retrieved on Oct. 13, 2006]. Retrieved from the Internet:: URL:http://www.ieee802.org/16/tge/contrib/CB0216e-03_15.pdf. 1-5 pages.

Kim, Y. et al. "Management of Sleep Windows Size during Handover", IEEE C802.16E-04/75, IEEE 802.16 Broadband Wireless Access Working Group [online], May 10, 2004 [retrieved on Oct. 3, 2006]. Retrieved from the Internet: URL:http://www.ieee802.org/16/tge/contrib/C80216e-04_75.pdf pp. 1-7.

R. Droms; "RFC 2131: Dynamic Host Configuration Protocol"; Mar. 1997, Network Working Group, Bucknell University.

Institute of Electrical and Electronic Engineering (IEEE), "Draft Amendment to IEEE Standard for Local and Metropolitan Area Networks—Part 16: Air Interface for Fixed and Mobile Broadband Wireless Access Systems—Amendment for Physical and Medium Access Control Layers for Combined Fixed and Mobile Operation in Licensed Bands," IEEE 802.16 TGe Working Document, IEEE 802. 16e-03/07r5, Dec. 9, 2003.

Son, Y.M., "Sleep Mode Operation During Handoff," IEEE 802.16 Broadband Wireless Access Working Group, IEEE 802.16e03/49, Sep. 4, 2003.

IEEE Standards Committee, "Part 16: Air Interface for Fixed and Mobile Broadband Wireless Access Systems—Amendment for Physical and Medium Access Control Layers for Combined Fixed and Mobile Operation in Licensed Bands," IEEE 802.16e-03/07r5, Dec. 2003, XP-002370467.

Daniel Wong, et al., "Soft Handoffs in CDMA Mobile Systems," IEEE Personal Communications, Dec. 1997, pp. 6-17.

* cited by examiner

METHOD FOR PERFORMING HANDOVER IN BROADBAND WIRELESS ACCESS SYSTEM

This application claims the benefits of Korean Application Nos. P2004-76085, filed on Sep. 22, 2004, P2004-92156, filed on Nov. 11, 2004, and, P2005-36861, filed on May 2, 2005, which are hereby incorporated by reference.

This application claims the benefit of U.S. Provisional Application Nos. 60/568,738, filed on May 7, 2004, and 60/570,836, filed on May 14, 2004, which are hereby incorporated by reference.

BACKGROUND OF THE INVENTION

1. Field of the Invention

The present invention relates to a method for controlling wireless access, and more particularly, to a method for performing handover in a broadband wireless access system. Although the present invention is suitable for a wide scope of applications, it is particularly suitable for a mobile subscriber station effectively maintaining a sleep mode in a broadband wireless access system mode after handover.

2. Discussion of the Related Art

A broadband wireless access system supports sleep mode in a mobile subscriber station (MSS) in order to minimize power usage in a battery. Sleep mode includes a sleep interval in which the MSS does not transmit with a base station (BS) in order to save power, and a listening interval which takes place between two sleep intervals to determine whether downlink traffic is transmitted to the MSS from the BS.

The broadband wireless access system includes three classes or categories of sleep mode based on the features of currently selected traffic. Sleep mode can also be expressed as power saving mode. There are three types of power saving class modes, further defined as power saving class parameters. A power saving class parameter 1 ("Class 1") includes an initial sleep window, final window base, final window exponent, listening window, and start frame number of sleep window parameters. Moreover, the objective of Class 1 type is to incorporate features such as Best Effort (BE) which includes features from the existing internet traffic or Non-Real-Time Variable Rate (NRT-VR) with varying transmission rate.

A power saving class parameter 2 ("Class 2") seeks to incorporate a feature of Real-Time Variable Rate (RT-VR) which varies Voice over Internet Protocol (VoIP) or transmission rate. Class 2 includes an initial sleep window, listening window, and start frame number of sleep window parameters.

A power saving class parameter 3 ("Class 3") includes periodic transmission of a control message to the MSS in sleep mode along with Downlink Channel Description/Uplink Channel Description (DCD/UCD) and a MOB-NBR-ADV messages for receiving information of neighboring BS coverage areas for handover or transmitting data for multicast transmission. Class 3 includes a final window base, final window exponent, and start frame number of sleep window parameters.

With respect to Class 1, the operation of sleep mode of the MSS is affected by the operation of the listening interval and the sleep interval which can be increased at a specified rate. The duration of the listening interval is determined by a MOB-SLP-REQ message and a MOB-SLP-RSP message. The MOB-SLP-REQ message is transmitted from the MSS requesting a base station (BS) if the MSS can enter sleep mode. The MOB-SLP-RSP message is received by the MSS from the BS in which the BS transmits a response to the request. During the listening interval, the MSS receives traffic indication message (MOB-TRF-IND) which is a control message of Medium Access Control (MAC). From the message, the MSS acquires information on whether any downlink traffic is transmitted or whether ranging procedure for maintaining a downlink coding type associated with uplink transmission maintenance and signal quality has to be performed.

The MSS only receives minimum amount of downlink signals from the BS in order to save power during the sleep interval. Even during sleep mode, the MSS can scan neighboring base stations in case handover has to be performed and can perform ranging procedure.

The MSS in sleep mode receives the MOB-TRF-IND message during the listening interval and determines whether to continue sleep mode, terminate sleep mode to receive downlink signal, or perform ranging procedure during sleep interval.

Figure 1:
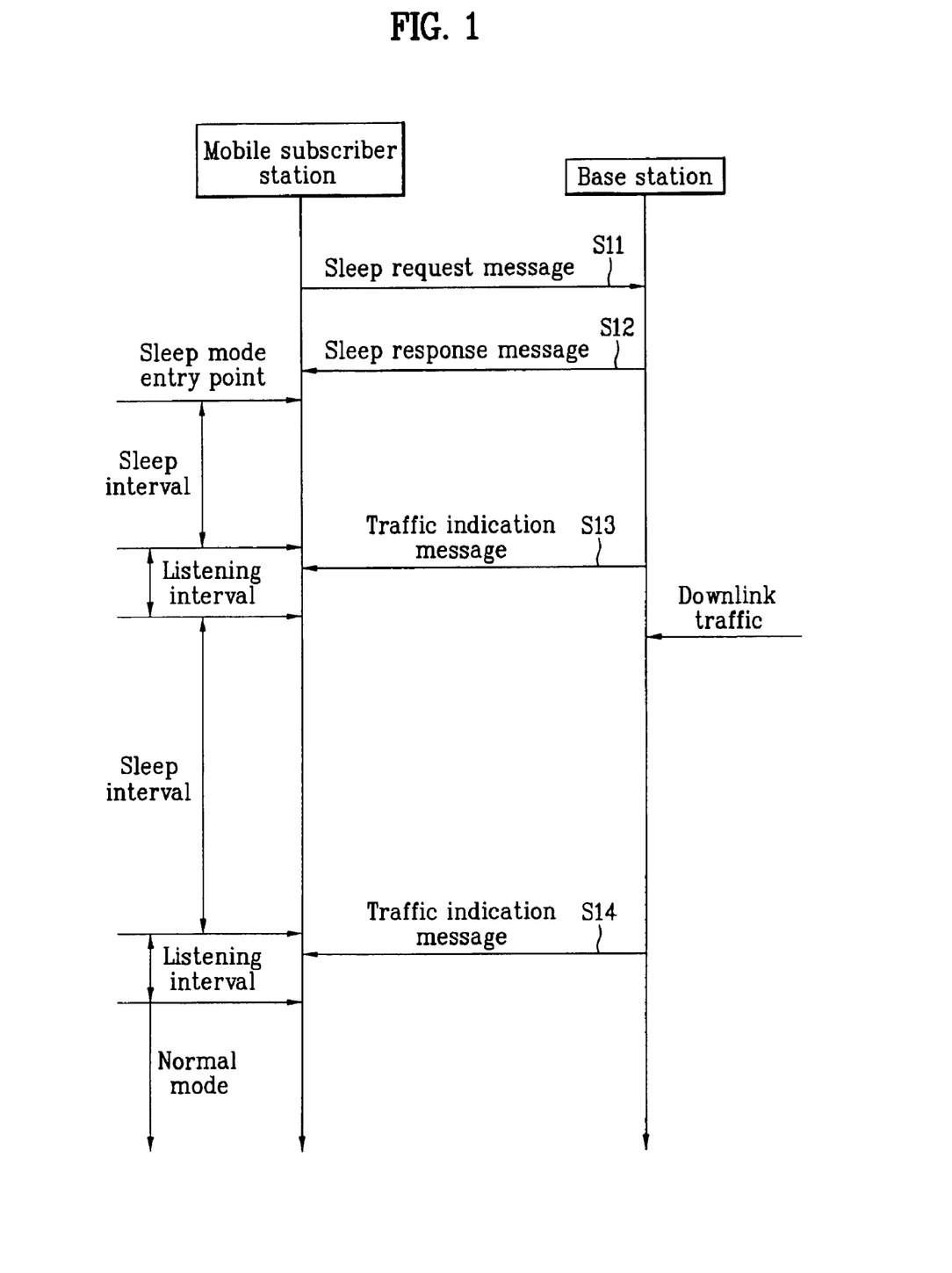
FIG. 1 illustrates an operation of sleep mode in power saving class parameter type 1.

FIG. 1 illustrates the operation of class 1 sleep mode. In FIG. 1, the MSS transmits the MOB-SLP-REQ message is transmitted to the BS to request for entry to sleep mode (S11). The MOB-SLP-REQ message includes information on an initial sleep interval, final sleep interval, and listening interval. The information related to the initial sleep interval, final sleep interval, and listening interval can be expressed in frames.

If the BS grants the MSS to enter sleep mode, the MOB-SLP-RSP message is received by the MSS (S12). The MOB-SLP-RSP message includes information on the initial sleep interval, final sleep interval, listening interval, and sleep mode entering point. The information of the initial sleep interval, final sleep interval, and listening interval included in the MOB-SLP-RSP message can be same or different from the information contained in the initial sleep interval, final sleep interval, and listening interval of the MOB-SLP-REQ message.

After receiving the MOB-SLP-RSP message, the MSS enters and remains in sleep mode for a specified duration. Upon expiration of the initial sleep interval, the MSS enters the listening interval. The MSS receives the MOB-TRF-IND message during the listening interval (S13) and receives any downlink traffic if transmitted from the BS.

Absent transmission of downlink traffic, the MSS enters subsequent sleep interval and remains in sleep mode for a specified duration. The duration of this second or subsequent sleep interval is measured from the duration of the first sleep interval. For example, the duration of the second sleep interval can be doubled from the duration of the first sleep interval. Subsequently, the duration of the third sleep interval is measured based on the size of the second sleep interval.

After the second sleep interval expires, the MSS enters another listening interval. The MSS receives the MOB-TRF-IND message during the listening interval (S14) and determines whether any downlink traffic exists. If there is downlink traffic, the MSS terminates sleep mode and returns to normal mode to receive downlink traffic from the base station.

However, if the MSS does not detect any downlink traffic during the listening interval, the duration of the subsequent sleep intervals are increased in the same manner as described above. Such a progressive increase in the duration of the sleep intervals is repeated until the duration of the sleep interval matches the duration of the final sleep interval. At this point, the duration the sleep interval is maintained at equal duration of the final sleep interval.

The information on the final sleep interval included in the MOB-SLP-REQ/RSP messages can be expressed by the final sleep window base and final window exponent. Here, the final sleep interval can be calculated using Equation 1.

$$\text{Final Sleep Window} = \text{Final Sleep Window Base} * 2^{\text{Final Window Exponent}} \quad \text{[Equation 1]}$$

If the MSS has to perform handover from sleep mode, for example, the MSS enters a neighboring BS coverage area, terminates sleep mode, and performs handover.

As discussed above with respect to increase in the duration of sleep intervals, the subsequent duration of the sleep interval is longer than the duration of the previous sleep interval for the MSS in sleep mode. The reason for this is because the BS determines that if no downlink traffic was transmitted during the current sleep interval, there is high probability that downlink traffic will not take place in the next sleep interval. Therefore, the BS increases the durations of the sleep interval after each listening intervals until the duration of the sleep interval matches the duration of the final sleep interval.

However, if the MSS terminates sleep mode to perform handover, the MSS returns to sleep mode after handover is completed. In such event, the MSS has to repeat the process of building up the duration of the sleep intervals. In other words, the MSS has to send the MOB-SLP-REQ message to request to enter into sleep mode to the BS, as did in the beginning of the process. Consequently, the MSS has to re-enter the sleep mode by making a request to the BS and progressively build up the duration of the sleep interval starting with the initial sleep interval.

Generally, handover usually takes place as a result of the MSS being in motion, regardless whether transmission of downlink traffic takes place. Therefore, it is inefficient for the MSS to re-enter sleep mode from the beginning or from the initial sleep interval which has reached a certain sleep interval or even the final sleep interval just because handover took place. Furthermore, because the duration of the sleep interval re-enters from the beginning, the listening intervals appear more frequently and unnecessarily transmits the MOB-TRF-IND messages accordingly.

For example, if the MSS having 1024 frames in the sleep interval executes handover, in order to reach sleep mode having 1024 frames in the sleep interval in the new cell, the MSS has receive nine MOB-TRF-IND messages assuming the initial sleep interval includes two frames. As a result, resources and power are wasted to transmit and receive nine MOB-TRF-IND messages.

Figure 2:
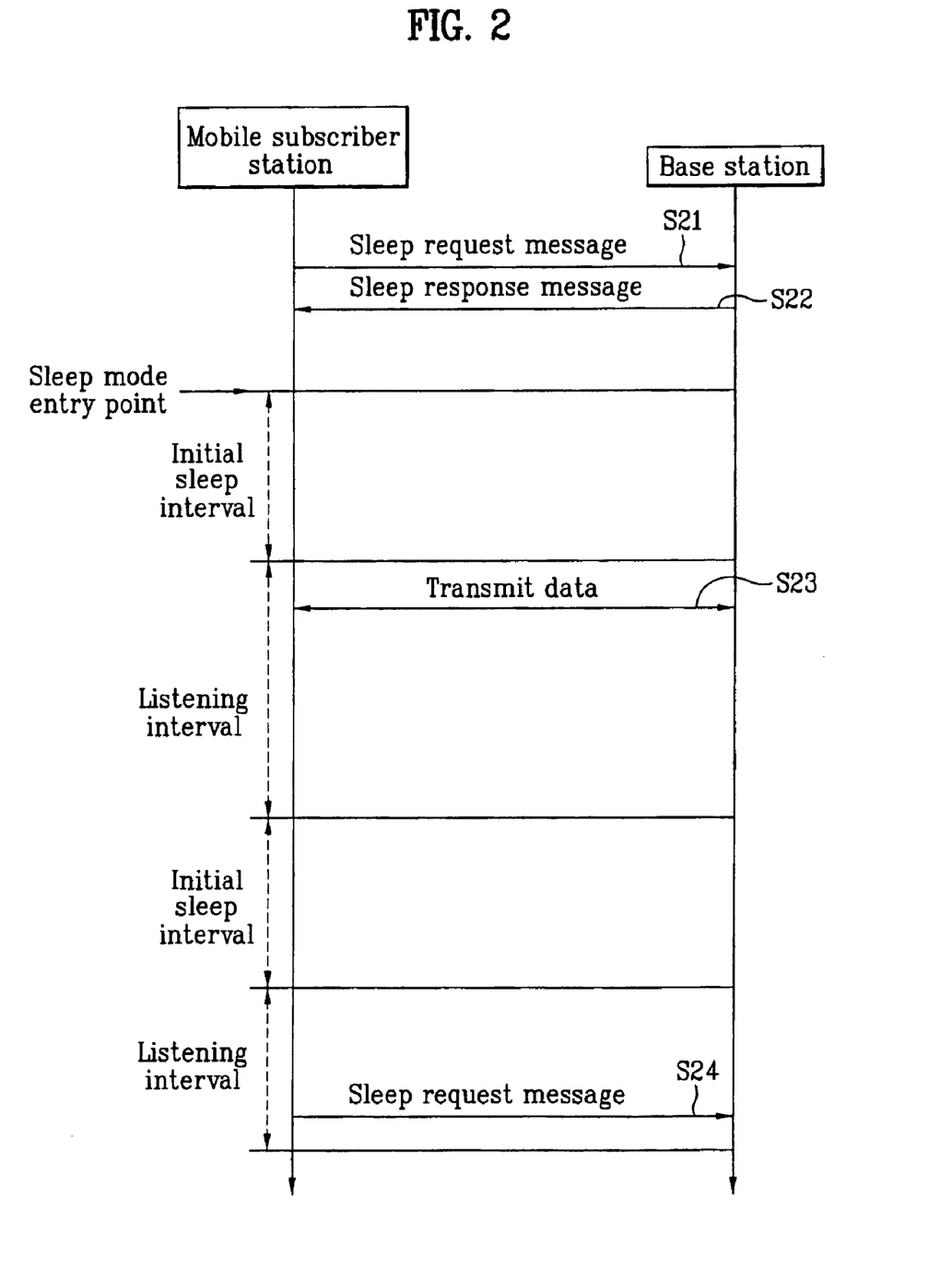
FIG. 2 illustrates an operation of sleep mode in power saving class parameter type 2.

With respect to Class 2, sleep mode of the MSS takes place in accordance with the listening interval and the sleep interval having a fixed duration. FIG. 2 illustrates the operation of Class 2 sleep mode. In FIG. 2, the MSS transmits the MOB-SLP-REQ message to the BS to request for entry to sleep mode (S21). The MOB-SLP-REQ message includes information on an initial sleep interval and listening interval. The information related to the initial sleep interval, final sleep interval, and listening interval can be expressed in frames.

If the BS grants the MSS to enter sleep mode, the MOB-SLP-RSP message is received by the MSS (S22). The MOB-SLP-RSP message includes information on the initial sleep interval, listening interval, and sleep mode entering point. The information of the initial sleep interval, final sleep interval, and listening interval included in the MOB-SLP-RSP message can be same or different from the information contained in the initial sleep interval and listening interval of the MOB-SLP-REQ message.

After receiving the MOB-SLP-RSP message, the MSS enters and remains in the initial sleep interval for a specified duration. Upon expiration of the initial sleep interval, the MSS enters the listening interval. During the listening interval, the MSS acquires a corresponding period in order to maintain uplink/downlink traffic with the BS and can receive downlink traffic transmitted from the BS (S23).

After the expiration of the listening interval, the MSS re-enters sleep mode for the duration of the initial sleep interval. Again, the MSS returns to the listening interval after expiration of the sleep interval at which point, the MSS can receive downlink traffic. If the MSS desires to terminate sleep mode, the MOB-SLP-REQ can be used during the listening interval to request for termination of sleep mode (S24) and transmits user data to the BS.

However, while in sleep mode, if the MSS returns to normal mode after terminating sleep mode to perform handover, the MSS re-enters sleep mode after handover is completed. In such event, the MSS has to transmit the MOB-SLP-REQ message to the BS as was done previously to enter sleep mode and receive the MOB-SLP-RSP message. As a result, the MSS cannot re-enter sleep mode immediately after completing handover operation but has to repeat the procedure of entering sleep mode.

Figure 3:
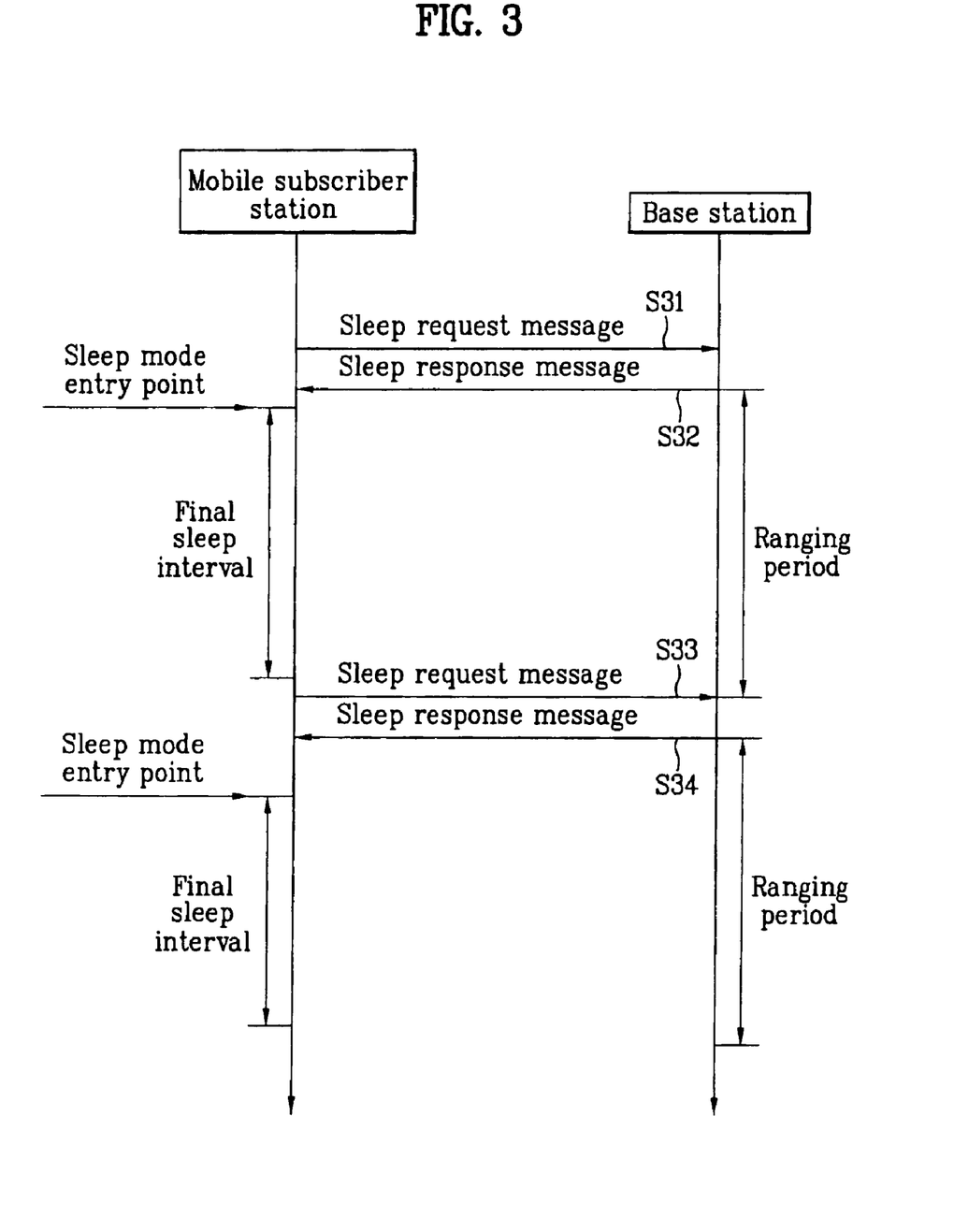
FIG. 3 illustrates an operation of sleep mode in power saving class parameter type 3.

With respect to Class 3, the MSS enters sleep mode based on the information transmitted via a periodic ranging procedure. FIG. 3 illustrates the operation of Class 3 sleep mode. In FIG. 3, the MSS acquires uplink transmission parameter by performing the ranging procedure periodically in order to maintain uplink transmission with the BS. In other words, the MSS transmits a ranging request (RNG-REQ) message (S31) and receives a ranging response (RNG-RSP) message from the BS (S32).

The RNG-RSP message includes information on uplink transmission parameter and power saving class parameter, which includes the final sleep interval and sleep mode entry point. The MSS enters sleep mode after receiving the RNG-RSP message and remains in sleep mode for the duration of the final sleep interval. After the sleep interval expires, the MSS communicates with the BS in normal mode and periodically performs handover procedure (S33, S34). During the ranging procedure, the MSS receives the RNG-RSP message (S34), and if the power saving parameter is included in the RNG-RSP message, the MSS enters sleep mode according to the RNG-RSP message.

However, if the MSS terminates sleep mode and returns to normal mode to perform handover operation, the MSS re-enters sleep mode after performing handover operation. In this case, the MSS has to transmit the same RNG-REQ message or the sleep request message as the one transmitted prior to performing handover. As a result, the MSS has to receive the sleep request message or the RNG-RSP message before allowed to re-enter sleep mode.

SUMMARY OF THE INVENTION

Accordingly, the present invention is directed to a method for performing handover in broadband wireless access system that substantially obviates one or more problems due to limitations and disadvantages of the related art.

An object of the present invention is to provide a method for providing sleep mode information so as to efficiently re-enter sleep mode after handover.

Another object of the present invention is to provide a method of entering sleep mode in a MSS in performing handover.

Another object of the present invention is to provide a method of controlling entry to sleep mode in a MSS.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of entering sleep mode in a MSS in performing handover from a first BS to a second BS includes entering sleep mode in the first base station and transmitting from the first base station sleep mode information in the first base station during handover while receiving from a second base station sleep mode entry information in the second base station. The method further includes entering sleep mode based on the information the sleep mode entry information received from the second base station.

In another aspect of the present invention, a method for a MSS entering sleep mode includes entering a first sleep mode in a first base station (BS) and performing handover from the first BS to a second BS. The method further includes transmitting from the first BS information on a last sleep interval of sleep mode to the second BS after completing handover and receiving from the second BS information on an initial sleep interval of a second sleep mode.

In another aspect of the present invention, a method of controlling entry to sleep mode of a MSS in a BS when a first BS performs handover to the second BS includes receiving sleep mode entry information in the first BS from the MSS during handover and transmitting sleep mode entry information in the second BS based on the sleep mode entry information in the first BS after termination of handover.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

For messages related to the operation each power saving class parameters in sleep mode, there are MOB-SLP-REQ, MOB-SLP-RSP, and MOB-TRF-IND messages. The MOB-SLP-REQ message is a MAC control message requesting for sleep mode by the MSS. The message includes information on a sleep interval and listening interval. Moreover, the MOB-SLP-RSP message is a MAC control message providing reply or answer to the request to the MSS. The message includes information on whether the request for sleep mode is granted as well as information on sleep interval, listening interval, and sleep identification. Additionally, the MSS uses the MOB-TRF-IND message to receive traffic indication message in order to determine whether to maintain sleep mode, terminate sleep mode to receive downlink traffic, or perform ranging procedure during sleep mode.

The ranging response message includes power saving class parameter which is a variable length parameter that can be composed of a plurality of encapsulated TLV fields. In other words, when necessary the power saving class parameter can include in a specific type parameter, parameters composed of various factors.

Figure 4:
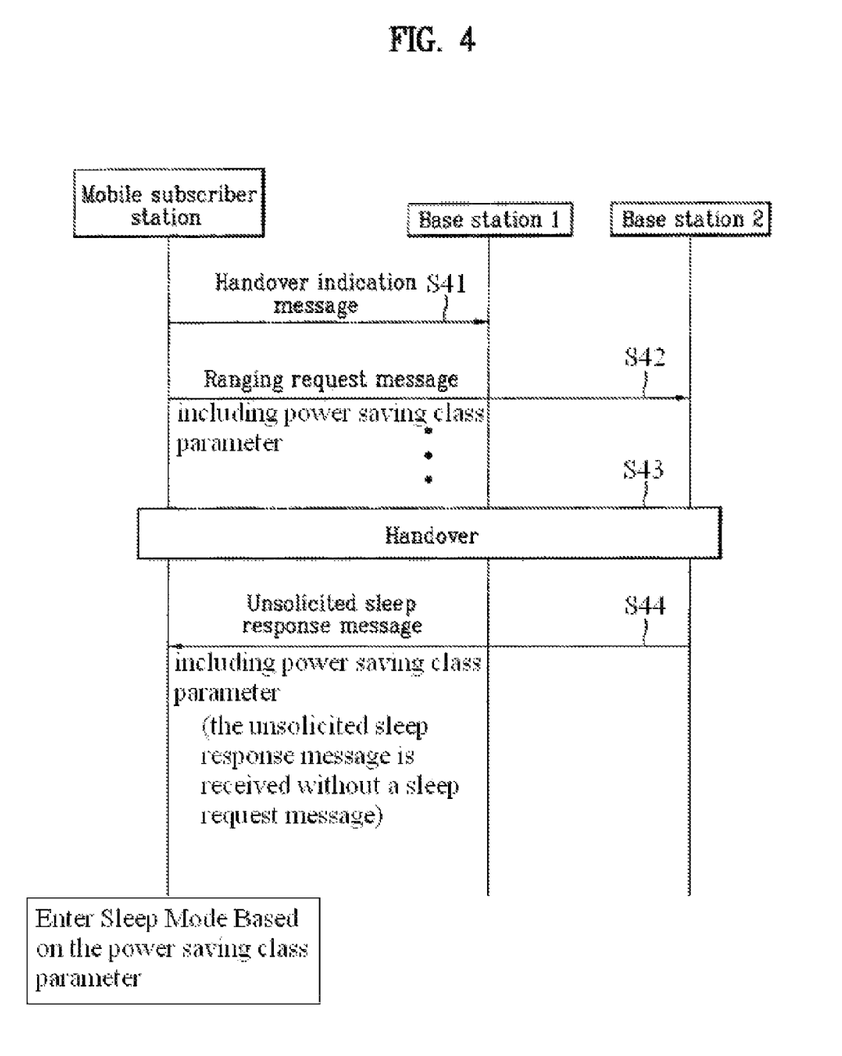
FIG. 4 illustrates a first example of transmitting sleep mode information.

FIG. 4 illustrates a first example of transmitting sleep mode information. In FIG. 4, while in sleep mode, the MSS transmits a handover indication (MOB-HO-IND) message to a serving BS (S41) in order to enter handover from the serving BS to a target BS. If the MSS has to maintain sleep mode after handover, while performing handover, the MSS can transmit information of the size of the final sleep window to the target BS during the ranging procedure. More specifically, the MSS can transmit information pertaining to the last sleep interval via the RNG-REQ message (S42). The ranging operation signifies a process of maintaining uplink transmission and signal quality associated with downlink coding type with the target BS.

An example of the RNG-REQ message is shown in Table 1.

TABLE 1

| Syntax | Size | Notes |
| --- | --- | --- |
| RNG-REQ_Message_Format( ) { | | |
| Management Message Type = 4 | 8 bits | |
| Downlink Channel ID | 8 bits | |
| TLV Encoded Information | variable | TLV specific |
| } | | |

Table 2 is an example of sleep mode parameter included in the RNG-REQ message.

TABLE 2

| Name | Type (1 byte) | Length | Value (Variable-length) |
| --- | --- | --- | --- |
| Power_Saving_Class_Parameters | 22 | variable | Compound TLV to specify Power Saving Class operation |
| Flags | | 1 | Bit 0: Definition 1 = Definition of Power Saving Class Present |

TABLE 2-continued

| Name | Type (1 byte) | Length | Value (Variable-length) |
|------|---------------|--------|--------------------------|
| | | | Bit 1: Operation<br>1 = Activation of Power Saving Class<br>0 = Deactivation or Power Saving Class (for types 1 and 2 only)<br>Bit 2: TRF-IND_Required<br>For Power Saving Class Type 1 only.<br>1 = BS shall transmit at least one TRF-IND message during each listening window of the Power Saving Class. This bit shall be set to 0 for another types<br>Bits 3–7: reserved |
| Power_Saving_Class Type | | 1 | Power Saving Class Type as specified in 6.3.2.3 |
| listening window | | 1 | Assigned Duration of MSS listening interval (measured in framed) |
| final-sleep window base | | 1 | Assigned final value for the sleep interval (measured in frame) base. If this value is included in RNG-REQ message for type 1, it shall be used to indicate the former value of sleep-window before handover. |
| final-sleep window exponent | | 1 | Assigned final value for the sleep interval (measured in frames) exponent. If this value is included in RNG-REQ message for type 1, it shall be used to indicate the former value of sleep-window before handover. |
| SLPID | | 1 | A number of assigned by the BS whenever an MSS is instructed to enter sleep-mode. |
| Old CID | | | CID of connection to be included into the Power Saving Class. There may be several TLVs of this type in a single compound Power_Saving_Class_Parameters TLV. If this item is included in RNG-REQ message, the value of this type indicates Old CIT that was associated with Power Saving Class before handover. |
| Last Sleep Window | | 1 or 2 | Using this value in RNG-REQ message, the MSS may indicate the former value of sleep-window without using final-sleep window base and final-sleep window exponent. The length of this value shall be 1 or 2 bytes. This value si for type 1 only. |
| Direction | | 1 | Direction for management connection which is added to Power Saving Class. |

By adding power saving class parameter to the RNG-REQ message, similar to the example in Table 2, the MSS can transmit to the target BS information pertaining to the MSS's desire to remain sleep mode after handover.

After the MSS executes handover (S43) to the target BS and if the target BS permits the MSS to enter sleep mode, the MSS receives an unsolicited MOB-SLP-RSP message which allows the MSS to enter sleep mode (S44) in the target BS. The MOB-SLP-RSP message includes information on the duration of the initial sleep interval of the MSS.

The duration of the initial sleep interval can be same or different from the duration of the former sleep interval included in the RNG-REQ message. In other words, the target BS determines whether to set the value of initial sleep interval same as the value of the former sleep interval before handover. The former sleep interval refers to the sleep interval of the MSS in the serving BS before handover.

As another embodiment of the present invention, as a response to the ranging request message, the BS 2 can transmit the ranging response message using the same power save class parameter as in Table 2. In this case, the power saving class parameter is included in the ranging response message. As a result, the MSS can enter sleep mode without receiving the unsolicited sleep response message with respect to FIG. 4.

In the unsolicited MOB-SLP-RSP message, the value of initial sleep interval is limited to 8 bits. If the size of the sleep window is larger than $2^8-1$ frames before handover, the MOB-SLP-RSP cannot be expressed. In addition, to express such a large initial sleep window, information such describe in Table 3 can be include in the unsolicited MOB-SLP-RSP message. Table 3 includes the information on initial sleep interval included in the unsolicited MOB-SLP-RSP.

TABLE 3

| Name | Type (1byte) | Length | Value (Variable-length) |
|---|---|---|---|
| Permitted Initial Sleep Window | TBD | Variable | This value indicates the initial value of sleep-window that is permitted for the MSS when it enters Sleep Mode after handover. This value shall be included only when the BS received an RNG-REQ message including Power_Saving_Class_Parameter TLV, and may not necessarily be equal to the former value of sleep-window before handover. This value shall be applied to type 3 only and its length shall be 1 or 2 bytes. |

Figure 5:
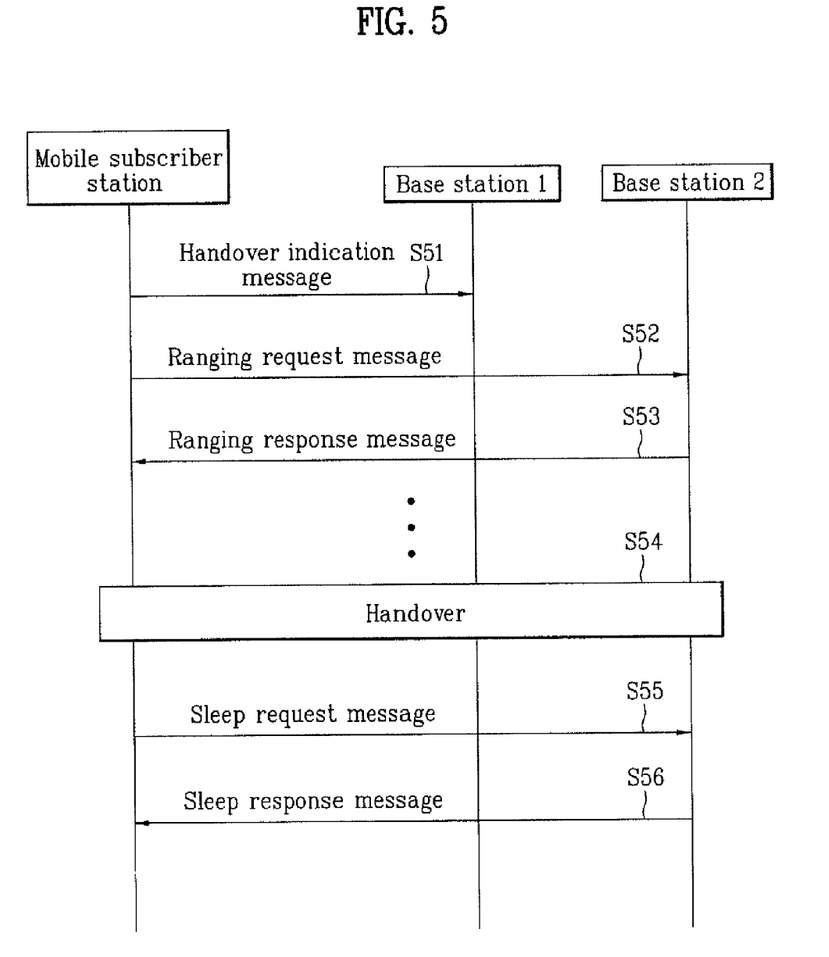
FIG. 5 illustrates a second example of transmitting sleep mode information.

FIG. 5 illustrates a second example of transmitting sleep mode information. In FIG. 5, the MSS in sleep mode transmits the MOB-HO-IND message to the serving BS to execute handover from the serving BS to the target BS (S51). The MSS then performs the ranging procedure by transmitting the RNG-REQ message to the BS2 (S52) and receiving the RNG-RSP message (S53). The ranging operation signifies a process of maintaining uplink transmission and signal quality associated with downlink coding type with the target BS.

Table 4 is an example of a RNG-RSP message. An example of RNG-REQ message is shown in Table 1.

TABLE 4

| Syntax | Size | Notes |
|---|---|---|
| RNG-RSP_Message_Format( ) { | | |
| Management Message Type = 5 | 8 bits | |
| Uplink Channel ID | 8 bits | |
| TLV Encoded Information | variable | TLV specific |
| } | | |

After the MSS executes handover (S54), if the MSS desires to stay in sleep mode, the MSS transmits the information of the last sleep interval to the target BS. Here, the MSS can determine the necessary initial sleep window value for the sleep interval and transmit the information to the target BS independent of the former sleep window value for the sleep interval of the serving BS.

The former sleep window value for the sleep interval can be transmitted to target BS via the MOB-SLP-REQ message after handover (S55). Subsequently, the target BS can transmit the initial sleep window value to the MSS via the MOB-SLP-RSP message (S56). Here, the initial sleep window value for the sleep interval transmitted from the MSS can be same or different from the initial sleep window value for the sleep interval transmitted from the target BS.

In the unsolicited MOB-SLP-RSP message, the value of initial sleep window is limited to 8 bits. If the size of the sleep window is larger than $2^8-1$ frames before handover, the MOB-SLP-RSP cannot be expressed. Therefore, the MOB-SLP-REQ/RSP messages need to extend the size of initial sleep window to express the large initial sleep window.

Table 5 shows a format of the MOB-SLP-REQ message according to a first example of an initial sleep window size transmission method.

TABLE 5

| Syntax | Size | Notes |
|---|---|---|
| MOB-SLP-REQ_Message_Format( ) { | | |
| Management message type = 46 | 8 bits | |
| Initial-sleep window | 6 bits | If the MSS was in the sleep mode with sleep window size which is larger than $2^8-1$, the MSS may set this field to '1111111' |
| final-sleep window base | 10 bits | |
| listening interval | 4 bits | |
| final-sleep window exponent | 3 bits | |
| Reserved | 1 bit | |
| } | | |

If the MOB-SLP-REQ message is constructed as in Table 5, the initial sleep window size having more than $2^8$-1 frames cannot be expressed. In such a case, the MSS may set the initial sleep window field, which shows the size of the initial sleep window, to "1111111" so that the initial sleep window after handover may have a sleep window size of more than $2^8$-1 frames. Preferably, the initial sleep window size is same as the former sleep window size before handover.

Table 6 shows a format of the MOB-SLP-REQ message according to a second example of an initial sleep window size transmission method.

TABLE 6

| Syntax | Size | Notes |
|---|---|---|
| MOB-SLP-REQ_Message_Format( ) { | | |
| Management message type = 46 | 8 bits | |
| Initial-sleep window | 29 bits | |
| Final-sleep window base | 10 bits | |
| listening interval | 4 bits | |
| Final-sleep window exponent | 3 bits | |
| Reserved | 2 bits | |
| } | | |

Table 7 shows a format of the MOB-SLP-RSP message according to a second example of an initial sleep window size transmission method.

TABLE 7

| Syntax | Size | Notes |
|---|---|---|
| MOB-SLP-RSP_Message_Format( ) { | | |
| Management message type = 47 | 8 bits | |
| Sleep-approved | 1 bit | 0: Sleep-mode request denied 1: Sleep-mode request approved |
| If(Sleep-approved == 0) { | | |
| After-REQ-action | 1 bit | 0: The MSS may retransmit the MOB-SLP-REQ message after the time duration (REQ-duration) given by the BS in this message |

TABLE 7-continued

| Syntax | Size | Notes |
|---|---|---|
| | | 1: The MSS shall not retransmit the MOB-SLP-REQ message and shall await the MOB-SLP-RSP message from the BS |
| REQ-duration | 4 bits | Time duration for case where After-REQ-action value is 0. |
| Reserved | 2 bits | |
| } | | |
| else { | | |
| Start frame | 6 bits | |
| initial-sleep window | 29 bits | |
| final-sleep window base | 10 bits | |
| listening interval | 4 bits | |
| final-sleep window exponent | 3 bits | |
| SLPID | 10 bit | |
| Reserved | 1 bit | |
| } | | |
| } | | |

If the formats of MOB-SLP-REQ/RSP messages are constructed as in Tables 6 and 7, the initial sleep window field which shows the initial sleep window size is allocated 29 bits so that the information of the initial sleep window size after handover can be expressed. Preferably, the initial sleep window size is same as the former sleep window size before handover.

Table 8 shows a format of the MOB-SLP-REQ message according to an initial sleep window size of the third example.

TABLE 8

| Syntax | Size | Notes |
|---|---|---|
| MOB-SLP-REQ_Message_Format( ) { | | |
| Management message type = 46 | 8 bits | |

TABLE 8-continued

| Syntax | Size | Notes |
|---|---|---|
| Initial-sleep window base | 6 bits | |
| final-sleep window base | 10 bits | |
| listening interval | 4 bits | |
| final-sleep window exponent | 3 bits | |
| previous sleep count | 5 bits | If the MSS was not in sleep mode just before handover, this field is set to '0000' |
| Reserved | 4 bits | |
| } | | |

Table 9 shows a format of the MOB-SLP-RSP message according to a third example of an initial sleep window size transmission method.

TABLE 9

| Syntax | Size | Notes |
|---|---|---|
| MOB-SLP-RSP_Message_Format( ) { | | |
| Management message type = 47 | 8 bits | |
| Sleep-approved | 1 bit | 0: Sleep-mode requested denied<br>1: Sleep-mode request approved |
| If(Sleep-approved == 0) { | | |
| After-REQ-action | 1 bit | 0: The MSS may retransmit the MOB-SLP-REQ message after the time duration (REQ-duration) given by the BS in this message<br>1: The MSS shall not retransmit the MOB-SLP-REQ message and shall await the MOB-SLP-RSP message from the BS |
| REQ-duration | 4 bits | Time duration for case where After-REQ-action valued is 0. |
| Reserved | 2 bits | |
| } | | |
| else { | | |
| Start frame | 6 bits | |
| initial-sleep window base | 6 bits | |
| final-sleep window base | 10 bits | |
| listening interval | 4 bits | |
| final-sleep window exponent | 3 bits | |
| previous sleep count | 5 bits | If the MSS was not in sleep mode just before handover, this field is set to '00000' |
| SLPID | 10 bits | |
| Reserved | 3 bits | |
| } | | |
| } | | |

As shown in Tables 8 and 9 with respect to the formats of the MOB-SLP-REQ/RSP messages, the initial sleep window size can be calculated by using Equation 2.

$$\text{Initial sleep window} = \text{Initial sleep window base} * 2^{previous\ sleep\ count} \quad \text{[Equation 2]}$$

In order to transmit the initial sleep window information to the BS2, "initial sleep window base" field and "previous sleep count" field should be included in the MOB-SLP-REQ/RSP messages. In addition, the MSS and the BS can use Equation 2 to calculate the initial sleep window size in the BS2. Preferably, the initial sleep window size is same as the former sleep window size before handover.

Table 10 shows a format of the MOB-SLP-REQ message according to a fourth example of an initial sleep window size transmission method.

TABLE 10

| Syntax | Size | Notes |
|---|---|---|
| MOB-SLP-REQ_Message_Format( ) { | | |
| Management message type = 46 | 8 bits | |
| Initial-sleep window base | 6 bits | |
| listening interval | 4 bits | |
| maximum sleep count | 5 bits | |
| previous sleep count | 5 bits | |
| Reserved | 4 bits | |
| } | | |

Table 11 shows a format of the MOB-SLP-RSP message according to a fourth example of an initial sleep window size transmission method.

TABLE 11

| Syntax | Size | Notes |
|---|---|---|
| MOB-SLP-RSP_Message_Format( ) { | | |
| Management message type = 47 | 8 bits | |
| Sleep-approved | 1 bit | 0: Sleep-mode request denied<br>1: Sleep-mode request approved |
| If(Sleep-approved == 0) { | | |
| After-REQ-action | 1 bit | 0: The MSS may retransmit the MOB-SLP-REQ message after the time duration(REQ-duration) given by the BS in this message<br>1: The MSS shall not retransmit the MOB-SLP-REQ message and shall await the MOB-SLP-RSP message from the BS |
| REQ-duration | 4 bits | Time duration for case where After-REQ-action value is 0. |
| Reserved | 2 bits | |
| } | | |
| else { | | |
| Start frame | 6 bits | |
| initial-sleep window base | 29 bits | |
| listening interval | 4 bits | |
| maximum sleep count | 5 bits | |
| previous sleep count | 5 bits | |
| SLPID | 10 bits | |
| Reserved | 1 bit | |
| } | | |
| } | | |

As shown in Tables 8 and 9 with respect to the MOB-SLP-REQ/RSP messages, the initial sleep window size can be calculated by using Equation 3.

$$\text{Initial sleep window} = \text{Initial sleep window base} * 2^{previous\ sleep\ count} \quad \text{[Equation 3]}$$

The final sleep window size of each BS coverage area can be calculated using Equation 4.

$$\text{Final sleep window} = \text{Initial sleep window base} * 2^{maximum\ sleep\ count} \quad \text{[Equation 4]}$$

In order to transmit the initial sleep window information to the BS2, "initial sleep window base" field, "maximum sleep count" field, and "previous sleep count" field should be included in the MOB-SLP-REQ/RSP messages. The MSS and the BS2 can use Equation 2 to calculate the initial sleep window size in the BS2. Preferably, the initial sleep window size is same as the former sleep window size before handover. In addition, the MSS and the BS can use Equation 4 to calculate the final sleep window size.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of maintaining a sleep mode by a mobile subscriber station (MSS) while performing a handover from a first base station (BS) to a second BS, the method comprising:
   the MSS entering the sleep mode while communicating with the first BS;
   the MSS transmitting a handover indication message to the first BS to indicate that the MSS is about to perform the handover;
   the MSS transmitting a ranging request message to the second BS when the MSS is attempting to perform the handover, wherein the ranging request message comprises power saving class parameters for informing the second BS of a preference of the MSS to continue in the sleep mode after the handover;

receiving an unsolicited sleep response message from the second BS when the MSS has transmitted the ranging request message including the power saving class parameters to the second BS, wherein the unsolicited sleep response message includes the power saving class parameters; and the MSS entering the sleep mode based on the power saving class parameters in the unsolicited sleep response message received from the second BS, wherein the power saving class parameters include information used for operating the sleep mode, and wherein the unsolicited sleep response message is received without a sleep request message.

2. The method of claim 1, wherein the power saving class parameters include a power saving class parameter type, a listening window, an initial sleep window, a final sleep window base and a final sleep window exponent.

3. The method of claim 2, wherein the initial sleep window parameter comprises 8 bits.

4. The method of claim 3, wherein a size of the initial sleep window parameter does not exceed $2^8-1$ frames if an initial sleep window field is set to "1111111."

5. The method of claim 2, wherein the size of the final sleep window is calculated by using a formula: Final Sleep Window=Final Sleep Window Base*$2^{Final\ Window\ Exponent}$.

6. The method of claim 2, wherein:
the power saving class type is one of three power saving class types including a first power saving class parameter type, a second power saving class parameter type and a third power saving class parameter type;
the first power saving class parameter type used for a connection of a Non-Real-Time Variable Rate (NRT-VR) type in which a transmission rate varies;
the second power saving class parameter type used for a connection of a Voice over Internet Protocol (VoIP) or a Real-Time Variable Rate (RT-VR); and
the third power saving class parameter type used for a periodic transmission of a control message to the MSS in the sleep mode or a multicast transmission of data.

7. The method of claim 6, wherein the initial sleep window and the listening window are set to zero when the power saving class type is set to the third power saving class type.

8. The method of claim 6, wherein the final sleep window base is set to zero when the power saving class type is set to the second power saving class type.

9. A mobile subscriber station (MSS) for maintaining a sleep mode while performing a handover from a first base station (BS) to a second BS, wherein the mobile subscriber station is configured to:
transmit a handover indication message to the first BS to indicate the MSS is about to perform the handover while the MSS is in a sleep mode;
transmit a ranging request message to the second BS when the MSS is attempting to perform the handover, wherein the ranging request message comprises power saving class parameters for informing the second BS of a preference of the MSS to continue in the sleep mode after the handover;
receive an unsolicited sleep response message from the second BS when the MSS has transmitted the ranging request message including the power saving class parameters to the second BS, wherein the unsolicited sleep response message includes the power saving class parameters; and
enter the sleep mode based on the power saving class parameters in the unsolicited sleep response message received from the second BS,
wherein the power saving class parameters include information used for operating the sleep mode, and
wherein the unsolicited sleep response message is received without a sleep request message.

10. The mobile subscriber station of claim 9, wherein the power saving class parameters include a power saving class parameter type, a listening window, an initial sleep window, a final sleep window base and a final sleep window exponent.

11. The mobile subscriber station of claim 10, wherein the initial sleep window parameter comprises 8 bits.

12. The mobile subscriber station of claim 11, wherein a size of the initial sleep window parameter does not exceed $2^8-1$ frames if an initial sleep window field is set to "1111111."

13. The mobile subscriber station of claim 10, wherein the size of the final sleep window is calculated by using a formula: Final Sleep Window=Final Sleep Window Base*$2^{Final\ Window\ Exponent}$.

14. The mobile subscriber station of claim 10, wherein:
the power saving class type is one of three power saving class types including a first power saving class parameter type, a second power saving class parameter type and a third power saving class parameter type;
the first power saving class parameter type used for a connection of a Non-Real-Time Variable Rate (NRT-VR) type in which a transmission rate varies;
the second power saving class parameter type used for a connection of a Voice over Internet Protocol (VoIP) or a Real-Time Variable Rate (RT-VR); and
the third power saving class parameter type used for a periodic transmission of a control message to the MSS in the sleep mode or a multicast transmission of data.

15. The mobile subscriber station of claim 14, wherein the initial sleep window and the listening window are set to zero when the power saving class type is set to the third power saving class type.

16. The mobile subscriber station of claim 14, wherein the final sleep window base is set to zero when the power saving class type is set to the second power saving class type.

* * * * *